United States Patent [19]

Scaccia et al.

[11] Patent Number: 4,644,015

[45] Date of Patent: Feb. 17, 1987

[54] STABLE POLYOL-MELAMINE BLEND FOR USE IN THE MANUFACTURE OF FIRE RETARDANT FLEXIBLE URETHANE FOAM

[75] Inventors: Carl Scaccia, Worthington; Dennis H. Fisher, Westerville; Peter E. Throckmorton, Plain City, all of Ohio

[73] Assignee: Ashland Oil, Inc., Ashland, Ky.

[21] Appl. No.: 860,952

[22] Filed: May 8, 1986

[51] Int. Cl.⁴ .............................................. C08G 18/14
[52] U.S. Cl. .................................. 521/129; 252/182; 521/128; 521/163; 521/167
[58] Field of Search ............... 521/129, 163, 167, 128; 252/182

[56] References Cited

U.S. PATENT DOCUMENTS 4,221,875  9/1980  Yukuta et al. .................. 521/128
4,385,131  5/1983  Fracalossi et al. ............... 521/55

Primary Examiner—Maurice J. Welsh
Attorney, Agent, or Firm—Mary E. Picken

[57] ABSTRACT

Blends of polyol and melamine for use in the manufacture of fire retardant polyurethane foams are stabilized by the addition of diethanolamine, ethanolamine, trihexylamine, or mixtures thereof.

12 Claims, 2 Drawing Figures

STABLE POLYOL-MELAMINE BLEND FOR USE IN THE MANUFACTURE OF FIRE RETARDANT FLEXIBLE URETHANE FOAM

BACKGROUND OF THE INVENTION

Polyurethane foams are made from polyfunctional isocyanates and hydroxyl-containing polymers, along with the catalysts necessary to control the rate and type of reaction, foaming agents, and other additives necessary to control the surface chemistry of the process. The methods of production of polyurethane foams are well known. The Kirk-Othmer Encyclopedia of Chemical Technology, John Wiley and Sons, Third Edition and Saunders and Frisch, Polyurethanes, Krieger Publishing, are excellent references for the chemistry of polyurethane foams. The uses of polyurethane foams are also well known. For example, foamed polyurethane compositions have found widespread use in the fields of insulation and structural reinforcement. Flexible polyurethane foams are used as cushioning in furniture and automobiles and as acoustical deadening layers in cabinets such as computer housings Melamine crystal is frequently used in these polyurethane foams to make the foams fire retardant U.S. Pat. Nos. 4,385,131 and 4,221,875 describe the incorporation of melamine into foams for resistance to both smoldering combustion and flaming combustion.

One commercial process for formulation of a fire resistant polyurethane foam consists of blending a first steam combining polyol and melamine with a second stream combining isocyanate and foaming agent with a third stream combining water, surfactant and reaction catalyst. The first, second and third streams are mixed in a multi-stream "mixing head". On exiting from the mixing head the polyurethane forms in a foamed state. In this process, other known materials, such as extenders, fillers and pigments are commonly employed as well.

Several major difficulties are encountered when combining polyol and melamine in a mixing tank to prepare the first stream in this commercial process. When a blend having a 1 to 1 weight ratio of polyether polyol to melamine is prepared the viscosity levels are excessively high for conventional commercial equipment and the uniformity of the blend is only temporary, the melamine separates out and settles to the bottom of the mixing tank. In the mixing tank, the viscosity of the melamine-polyol blends, measured at typical shear levels of 10 to 20 seconds$^{-1}$, ranges from 7,000 to 15,000 centipoise, while in the pipe network system the viscosity measured at typical shear levels of 50$^{-1}$ to 100 seconds$^{-1}$ ranges from 6000 to 9000 centipoise. These viscosities are too high for the equipment in existing foam manufacturing facilities where high viscosities lead to excessive pressure drops that cannot be handled by conventional pumping systems and also lead to excessively slow flow rates for production. It is preferred to have viscosities less than 6000 centipoise at shear levels of 50$^{-1}$ seconds. If agitation of the blend is interrupted, as for example, by equipment malfunction, the melamine settles out forming a compact dense sediment which cannot be resuspended by mixing. Attempts to use an impeller to resuspend the sediment can result in damage to the impeller motor when the sediment is deep enough to cover the blades. If the compacted dense sediment layer of melamine forms in a tank, its removal is difficult and may even require workers to enter the tank to remove it manually. The settling out of melamine also creates a severe specific gravity gradient from the top to the bottom of the mixing tank which leads to non-uniform distribution of melamine in the final flexible foam product. Major problems are thus encountered in production which are directly caused by the inability to create and maintain a stable suspension of melamine and polyol.

OBJECT OF THE INVENTION

It is accordingly an object of this invention to provide a stable melamine polyol suspension. Another object of this invention is to provide a solution to the problem of excessive viscosities of the polyether polyol-melamine blend and a solution to the problem of non-uniform melamine distribution. Another object of this invention is the attaining of high concentrations of fine melamine particles in the foam product for optimum fire retardancy properties without excessive viscosities in the polyether-polyol melamine blend.

SUMMARY OF THE INVENTION

In accordance with the present invention a novel process is provided in which polyether-polyol melamine blends show lowered viscosities appropriate for conventional commercial equipment and are stable suspensions having uniform melamine distribution. The polyether polyol-melamine blend made by the process of the present invention incorporates higher concentrations of fine melamine particles at acceptable viscosity levels than polyol-melamine blends made conventionally. The resulting foam products have substantially superior fire retardancy because they contain a higher concentration and uniform distribution of melamine.

This invention is a method of manufacturing polyurethane foams wherein a first reaction stream containing polyol and melamine is combined with a second reaction stream containing isocyanate and foaming agent and a third reaction stream containing surfactant, catalyst and water, the improvement which comprises the addition of an effective stabilizing amount of an amine compound selected from the group consisting of diethanolamine, ethanolamine, trihexylamine or mixtures thereof to said first reaction stream creating a stable polyol-melamine suspension stream. In one embodiment this invention further comprises the addition of trichlorofluoromethane to said first reaction stream.

It has been discovered that this addition of certain amine compounds to the polyol-melamine stream has a dramatic effect on the stability of the polyol-melamine suspension. Useful amine compounds include diethanolamine, ethanolamine and trihexylamine. The preferred amine compound is diethanolamine. Heretofore no one has added the amine compound to the polyol-melamine stream to make a stable polyol-melamine suspension which also has viscosities which conventional equipment tolerates even at high levels of melamine to polyol.

The literature contains numerous references to the use of amine compounds for various other purposes in polyurethane reactions. Among these references; Soviet Patent No. 891,698 shows the use of tetrahydroxy propylene diamine in the production of a polyurethane foam made from; a polyether containing chloro-hydroxyl groups, polyisocyanate and melamine. The abstract of No. 891,698 does not address the question of melamine-polyol suspension stability. Soviet Patent No. 891,698 apparently uses the tetrahydroxy propylene diamine compound as a catalyst for the formation of polyurethane foam.

U.S. Pat. No. 4,500,655, using diethanolamine in a different way, is directed to polyols for use in polyurethane foams, the polyols being prepared by first reacting phenol, formaldehyde and diethanolamine to make a Mannich condensate. This condensate is then propoxylated with propylene oxide. The propoxylation product is reacted with melamine and a lower alkylene carbonate to make the polyol component for use in subsequent polyurethane foam manufacture. This reference thus uses diethanolamine as a reactant in the preparation of the polyol component. U.S. Pat. No. 4,145,488 similarly describes the use of the oxyalkylated Mannich reaction product of phenol, formaldehyde and diethanolamine as the polyol component of a polyurethane foam composition. The problem of polyol-melamine suspension stability is not addressed by either U.S. Pat. No. 4,500,655 or U.S. Pat. No. 4,145,488.

U.S. Pat. No. 4,296,213 describes the preparation of a polyurea polymer polyol by reacting a hydroxyl-containing amine, a polyether polyol and an organic polyisocyanate. For example, toluene diisocyanate was added to a mixture of polyether triol and diethanolamine to form a polyurea polymer polyol. The polyurea polymer polyol was then reacted with additional polyisocyanate to form a polyurethane product. This reference did not relate to the stability of melamine-polyol suspensions.

U.S Pat. No. 3,438,908 describes the addition of a stabilizing tertiary amine to a blend of polyol and tertiary amine catalyst. Thus stabilized the polyol-catalyst blend can be stored until used with polyisocyanate and retains full catalytic activity during storage. The stabilizing tertiary amines had half the catalytic activity of the catalytic tertiary amines. This reference did not relate to the stability of melamine-polyol blends nor did it mention diethanolamine.

U.S. Pat. Nos. 3,399,151 and 4,221,875 and British Pat. No. 1,384,771 describe the use of tertiary amines as reaction catalysts for the production of polyurethane from polyols and polyisocyanates. Diethanolamine is among the compounds well known as catalysts for the production of polyurethane foams according to British Pat. No. 1,384,771. No references were identified which relate to the use of amine stabilizing agents with melamine-polyol blends.

DESCRIPTION OF THE PREFERRED EMBODIMENT

Figure 1:
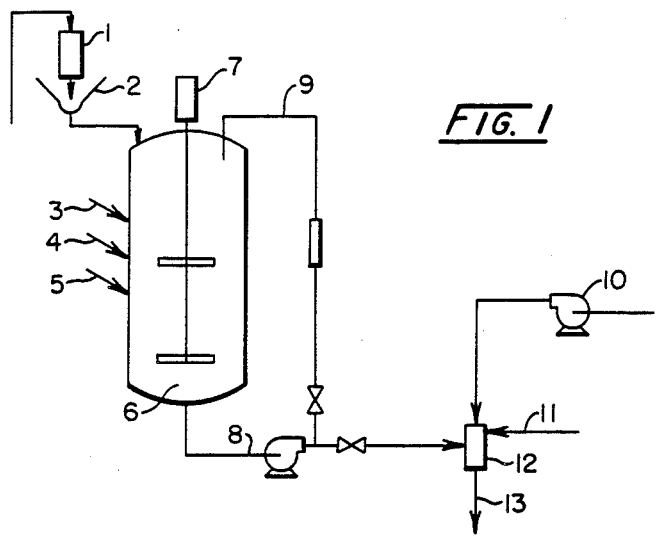
FIG. 1 is a diagram of the commercial process in which this invention is practiced Melamine crystal in the delumper (1) is supplied through the continuous feeder (2) to mixing tank (6) which is provided with impeller blades operated by motor (7). Polyol enters tank (6) through line (3), the diethanolamine of this invention enters tank (6) through line (4) and trichlorofluoromethane optionally enters tank (6) through line (5). The melamine-poluol suspension first reaction stream exits tank (6) through line (8) which contains a pump and a recirculation line (9) having an optional in-line mixer. the melamine-polyol suspension first reaction stream is then combined in mixing head (12) with the second reaction stream of blowing agent and polyisocyanate in line (11) and with the third reaction stream of surfactant, catalysts and water in line (10). The fire retardant polyurethane foam exits line (13) in a foamed state.

In a preferred embodiment the amine added to the first reaction stream containing polyol and melamine is an alkyl hydroxyl amine. In the most preferred embodiment the amine added to the first reaction stream to make the stable suspension is the secondary amine diethanolamine. In another preferred embodiment the foaming agent trichlorofluoromethane and diethanolamine are both added to this first reaction stream containing polyol and melamine to make the stable suspension.

The remainder of the process for making foams is conventional. In this process the first reaction stream is combined with a second reaction stream containing polyisocyanate and foaming agent and a third reaction stream containing surfactant, reaction catalyst and water. The polyol component of the first stream and the polyisocyanate, foaming agent, surfactant, and reaction catalyst of the second and third streams may be any which have been used in the production of polyurethane foam.

As the polyol component there may be used: polyesters made by reaction of an acid such as adipic acid and a polyhydric alcohol, polyethers made by the addition of an alkylene oxide such as ethylene oxide or propylene oxide to ethylene glycol, glycerol, propylene glycol, diethylene triamine, aromatic diamines, sucrose, sorbital and the like and other compounds having two terminal hydroxyl groups. The preferred polyol for use in this invention is Pluracol Polyol C-133 available from BASF Wyandotte Corp., Parsippany, N.J., a polyether polyol made from propylene glycol and ethylene glycol in a mole ratio of 2.7 to 1.0. The Pluracol Polyol C-133 has a hydroxyl number of 36.0 mg KOH/gm and an acid number of 0.015. Although in the preferred embodiment of the invention 100 parts polyol are combined with 100 parts melamine it is also acceptable to use from 20 to 120 parts melamine with 100 parts polyol depending on the degree of fire retardancy desired.

As polyisocyanates there may be used aromatic isocyanates such as tolylenediisocyanate, diphenylmethane diisocyanate, alicyclic isocyanates such as hydrogenated tolylene diisocyanate, or aliphatic isocyanates such as hexamethylene diisocyanate.

The melamine crystal used was that obtained from Melamine Chemicals, Inc. (MCI), Donaldsonville, La. This melamine is available in different grades having varying amounts of fine particles. "Fines" are defined as those particles passing through a 325 mesh sieve. Unground MCI Melamine has about 20% fines. Superfine MCI melamine has about 85% fines.

In the manufacture of fire resistant polyurethane foam maximizing the concentration of fine melamine particles consistent with acceptable viscosity is highly desired to obtain good flame retardant properties in the foam product. In the past, melamine with more than 20% concentrations of fine particles have led to unstable melamine-polyol blends of excessive viscosity. With the process of this invention melamine with concentrations of fine particles greater than 30 percent can be suspended in polyol without such excessive viscosity. It is even possible to use melamine with 64% fine particles to make foams when using the additives and process of this invention. Melamine is used in the preferred embodiment in the amount of 100 parts melamine to 100 parts polyol, however from 20 parts to 120 parts melamine may be used with 100 parts polyol.

Amines useful in the practice of this invention include tertiary amines such as trihexylamine and alkanol amines such as diethanolamine and ethanolamine. Diethanolamine is particularly preferred. From 0.5 to 5.0 parts diethanolamine are used with 100 parts polyol in a preferred embodiment, while from 1.0 to 2.0 parts diethanolamine are used with 100 parts polyol in a more preferred embodiment.

Trichlorofluoromethane, available from DuPont, Wilmington, Del. under the trademark FREON, is the preferred foaming agent used in the practice of this invention. Other foaming agents useful in this invention include the halogenated hydrocarbons difluorodichloromethane, 1,1,2-trichloro-1,2,2-trifluoroethane, methylene chloride, chloroform and carbon tetrachloride. In a preferred embodiment from 2 to 10 parts trichlorofluoromethane, sold as FREON R-11, are used with 100 parts polyol.

The following Examples show how the present invention has been practiced but should not be construed as limiting. In this application, all proportions and percentages are by weight unless otherwise expressly indicated. Also, all citations referenced herein are expressly incorporated herein by references.

Figure 2:
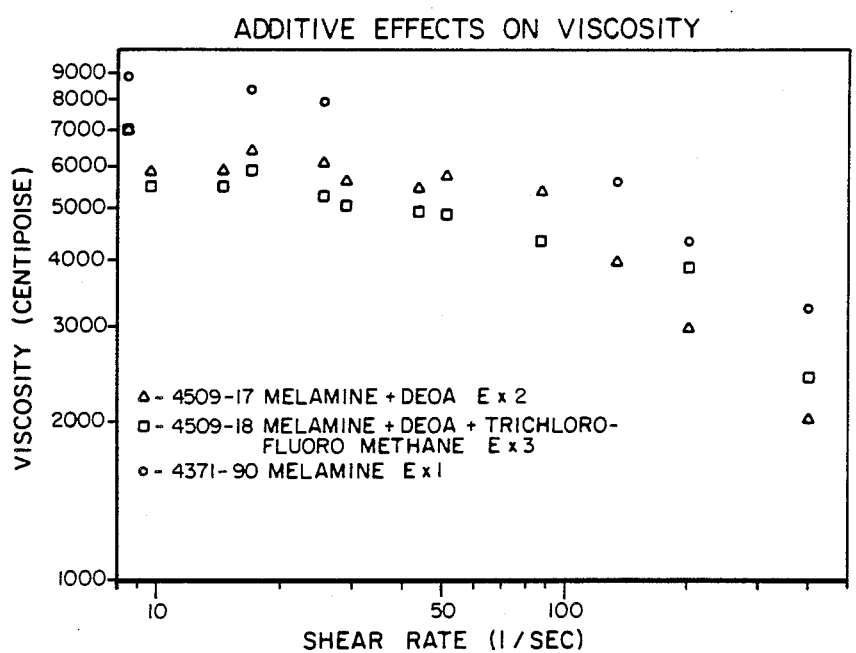
FIG. 2 graphically portrays the viscosity in centipoise versus shear rate in reciprocal seconds for the formulations of Examples 1, 2 and 3.

Examples 1 through 7 will establish the effectiveness of alkyl amines such as diethanolamine, ethanolamine and trihexylamine in providing stable polyol-melamine suspensions having commercially practical viscosities. Examples 1 and 1A demonstrate the problems encountered in conventional polyol-melamine mixtures. Example 2 demonstrates the improvement in accordance with this invention utilizing diethanolamine (DEOA) Example 3 demonstrates the improvement in accordance with this invention utilizing the foaming agent trichlorofluoromethane and diethanolamine. The results of Examples 1, 2 and 3 are reported in FIG. 2 where the viscosity in centipoise is shown versus shear rate in reciprocal seconds. Example 4 demonstrates the improvement utilizing trihexylamine. Example 4A demonstrates the improvement utilizing trichlorofluoromethane and trihexylamine. Example 5 demonstrates the excessive viscosities encountered in the absence of diethanolamine and the acceptable viscosities attained with diethanolamine at from 8% to 33% levels of fine particles of melamine. Example 6 provides comparative testing of related amine compounds. Example 7 provides the commercial embodiment of this invention.

EXAMPLE 1

(4371-90)

A control experiment was run in which the ingredients combined were the polyol and melamine. Neither trichlorofluoromethane nor amine were used. To a 2 liter reaction flask having an impeller of 5.8 cm diameter and calculated shear rate of 33 sec$^{-1}$ ("low shear") containing BASF polyol C-133 in the amount of 400 grams, 400 grams of unground MCI melamine containing 19.2% fines was added in 100 gram portions over a 10 minute interval while mixing at 200 RPM. Mixing was continued for an additional 20 minutes. The viscosity measured at 50$^{-1}$ sec. was 7000 centipoise. A 500 ml. portion was stored in a 500 ml. graduated cylinder. After seven days storage examination of the stored blend showed a hard, compact layer of sediment reaching the 60 ml. level. The suspension also showed a large gradient in specific gravity from the top (1.13 gm/cc) to the bottom (1.31 gm/cc) of the cylinder. The sediment layer would not redisperse using ordinary mixing methods. The blend prepared without trichlorofluoromethane or amine was shown to be unstable and non-uniform.

EXAMPLE 1A (4371-87)

A further experiment was run to evaluate the effect of shear rate during addition of melamine to polyol on the stability of the melamine-polyol suspensions. Following the procedure of Example 1 melamine was added to polyol in a flask having an impeller of 5.8 cm diameter and a calculated shear rate of 167 sec$^{-1}$ ("high shear"). After seven days storage examination of the stored blend showed a layer of sediment reaching the 107.5 ml level in a 500 ml graduated cylinder (4371.87). A comparison of the results from "low shear" mixing of Example 1 and "high shear" mixing of Example 1A shows that low shear mixing produces less sediment in a stored melamine-polyol blend.

EXAMPLE 2

(4509-17)

In this experiment the effect of adding a secondary dialkanol amine to the polyol-melamine blend was examined. To a 2 liter reaction flask was added BASF polyol C-133 in the amount of 400 grams and Union Carbide diethanolamine in the amount of 4.8 grams. After mixing at 200 RPM for one minute 400 grams unground MCI melamine containing 19.2% fines was added in 100 gram portions over a nine minute interval. Mixing was continued for an additional twenty minutes The viscosity measured at 50$^{-1}$ sec was 5650 centipoise. A 500 ml portion was stored and inspected after 7 days. No sediment was detected at the bottom of the cylinder. A 35 ml puddle of clearer polyol had separated at the surface of the sample. The specific gravity of this material at the top of the stored suspension was 1.04; the specific gravity of the remaining 465 mls of material at the bottom of the stored suspension ranged from 1.189 at the top to 1.22 at the bottom. The very modest mixing accomplished by simple single inversion of the cylinder restored the sample to a uniform suspension. The blend prepared from polyol, diethanolamine and melamine was found to be storage stable.

EXAMPLE 3

(4509-18)

In this experiment the effect of combining polyol, melamine, secondary dialkanol amine and trichlorofluoromethane was examined BASF Polyol C-133 in the amount of 400 grams and 4.8 grams Union Carbide diethanolamine were added to a 2 liter flask. After 1 minute blending 400 grams unground melamine containing 19.2% fines was added in 100 gram portions over a 9 minute interval. Mixing at 200 RPM was continued for 5 minutes. Trichlorofluoromethane in the amount of 20 grams was added and mixing was continued for 8 minutes. The viscosity measured at 50$^{-1}$ was 4880 centipoise. A 500 ml. portion was stored and inspected after 7 days. There was no measurable sediment on the bottom of the cylinder. A 15 ml puddle of clearer polyol appeared on the surface of the sample. The specific gravity between the 485 ml mark and the bottom of the suspension ranged from 1.196 to 1.246. Very modest mixing accomplished by a simple single inversion of the cylinder restored the sample to a uniform suspension. The blend prepared from polyol, melamine, secondary amine and trichlorofluoromethane was found to be storage stable The viscosities of the blends made in Examples 1, 2 and 3 were measured at varying shear rates and are reported in FIG. 2. At shear rates from $10^{-1}$ sec. to $100^{-1}$ seconds the Example 1 product had the highest viscosities. The effect of the diethanolamine on lowering viscosity in Example 2 is apparent. The lowest FIG. 2 viscosities at shear rates between $10^{-1}$ sec and 100 sec are those from Example 3 where diethanolamine and trichlorofluoromethane were both added to the melamine-polyol blend.

Example 3A illustes the effect of using trichlorofluoromethane alone with the melamine-polyol blend.

EXAMPLE 3A (4509-14)

In this experiment BASF Polyol C-133 in the amount of 400 grams and 5.6 grams Dow Corning surfactant 4053 were blended in a 2 liter reaction flask and mixed for 5 minutes at 200 RPM. Unground melamine having 19.2% fines was added in the amount of 400 grams in 100 gram portions over a 10 minute interval. Trichlorofluoromethane in the amount of 20 grams was added. The viscosity measured at 50 sec was 4390 centipoise. A 100 ml portion was stored and inspected after 3 days. An extensive layer of soft mushy sediment reaching to between the 45 ml and the 50 ml marks was noted. The blend prepared by combining polyol, melamine and trichlorofluoromethane was found to be unstable on storage.

EXAMPLE 4

(4509-3)

In this experiment the effect of combining polyol, melamine and trihexylamine was examined BASF polyol C-133 in the amount of 400 grams, Dow Corning 193 Surfactant in the amount of 5.6 grams and 4.8 grams trihexylamine were added to a 2 liter reaction flask and mixed for 20 minutes. Unground melamine containing 19.2% fines in the amount of 400 grams was added over a 9 minute interval while mixing at 250 RPM. Mixing was continued for 18 additional minutes A 500 ml. portion was stored and inspected after 7 days. There was a 70 ml. puddle of clearer liquid at the top of the sample with a specific gravity of 1.046. There was no measurable sediment at the bottom of the sample. The specific gravity for the remaining 430 mls of the suspension ranged from 1.239 at the top of the sample to 1.263 at the bottom. The blend prepared by combining polyol, melamine and tertiary alkyl amine was found to be storage stable.

Example 4 A illustrates the effect of adding both the tertiary amine, trihexylamine, and trichlorofluoromethane to the melamine-polyol blend.

EXAMPLE 4A (4509-2)

Following the procedure of Example 4 400 grams unground melamine containing 19.2% fines was added over a 9 minute internal to 400 grams BASF polyol C-133 and 5.6 grams Dow Corning 193 surfactant. After 25 minutes mixing 20 grams trichlorofluoromethane were added followed by 4.8 grams trihexylamine. A 500 ml. portion was stored and inspected after 7 days. There was a 40 ml. puddle of clearer liquid with a specific gravity of 1.046 at the top of the sample. There was no sedimentation at the bottom of the sample. The specific gravity for the remaining 460 mls of the suspension ranged from 1:176 at the top of the sample to 1.209 at the bottom. The blend prepared by combining polyol, melamine, tertiary alkyl amine (trihexylamine) and trichlorofluoromethane was found to be storage stable.

EXAMPLE 5

In this experiment the effect of using melamine having differing levels of "fines" was examined "Fines" are defined as those particles passing through a 325 mesh sieve. The procedure of Example 1 was followed in those tests where no amine was used. The procedure of Example 2 was followed in those tests where diethanol amine (DEOA) was used. The different melamine samples tested were first measured for the level of "fines" using standard screen tests. (ASTM Number D 1921-63 reapproved 1975). Four hundred gram portions of each type of melamine were added to polyol as described in Examples 1 and 2 as appropriate. The viscosities of the suspensions were measured and 500 ml examples of the suspensions were examined for stability 7 days after preparation. The results appear in Table 1 below. It can be concluded that the viscosities of melamine-polyol suspensions made without diethanolamine are excessively high for conventional commercial equipment. The suspensions made with diethanolamine have lower and useful viscosities at the high levels of melamine fines desirable for optimum fire retardant properties in the polyurethane foam product. The concentration of fine particles in the melamine can be varied from 8% to 64% with little change in the viscosity of the polyol-melamine suspension when diethanolamine is used to stabilize the polyol-melamine suspension. Without use of diethanolamine stabilizer the use of melamine having from 8% to 85% fine particles provides only unstable melamine-polyol blends.

TABLE 1

| | | Level of Fines in Melamine and the Viscosity of the Polyol-Melamine Suspension with and without Diethanolamine | | | |
|---|---|---|---|---|---|
| | | Without DEOA | | With DEOA | |
| Melamine | % Fines | Viscosity 50 sec-1 | Suspension Stability | Viscosity 50 sec-1 | Suspension Stability |
| MCI Unground | 7.9 | 6580 4509-70** | Unstable | 6,500 4509-22 | Stable* |
| | 19.2 | 7,000 4371-90 | Unstable | 5,670 4509-8 | Stable |
| | 33.2 | 7,100 4509-70 | Unstable | 5,510 4509-8 | Stable |
| MCI Ground | 64 | 7,100 4371-84 | Unstable | 6,000 4509-4 | Stable |
| MCI Superfine | 85.4 | 13,000 4371-83 | Unstable | 10,500 4509-11 | Stable |

*Definition of "Stable": No layer of sediment in sample on standing 7 days, specific gravity gradient is very small, there may be a small amount of polyol that has separated and risen to the surface of the sample but very minimal agitation is required to redisperse this polyol and yield a uniform suspension.
**Laboratory notebook reference This Example 6 illustrates the results obtained when comparative testing is done on a number of compounds related to diethanolamine.

EXAMPLE 6
(4509-59)

The procedure of Example 2 was followed substituting various amine-containing compounds for the diethanolamine of Example 2. The compounds tested and amounts used are reported in Table 2 below along with the results obtained. After 7 days storage the quality of the suspension was measured by attempting to empty the graduated cylinder in which the suspension was stored. The level at which the suspension was too stiff to pour out from the cylinder was recorded.

TABLE 2
Testing of Amine Compounds

| | Amine Compound | Suspension g./400 g. polyol Sediment in 500 Suspension | Quality of Level of ml stored after 7 days |
|---|---|---|---|
| 4509-59-1 | Ethanolamine | 2.8 g | 300 ml |
| 4509-68-4 | Ethanolamine | 5.6 g | 0 ml |
| 4509-65-1 | Ethanolamine | 2.8 g | 0 ml |
| 4509-68-1 | Ethanolamine | 2.8 g | 0 ml |
| 4509-59-2 | Isopropanolamine | 3.4 g | 300 ml |
| 4509-65-2 | Isopropanolamine | 3.4 g | 0 ml |
| 4509-68-2 | Isopropanolamine | 3.4 g | 270 ml |
| 4509-59-3 | 2-Amino, 2-Methyl-Propanol amine | 4.8 g | 290 ml |
| 4509-65-3 | 2-Amino, 2-Methyl-Propanol amine | 4.8 g | 250 ml |
| 4509-59-4 | Amino, Trimethoxy Methane | 5.5 g | 275 ml |
| 4509-65-4 | Amino, Trimethoxy Methane | 5.5 g | 260 ml |
| 4509-59-5 | Diisopropanolamine | 7.2 g | 275 ml |
| 4509-65-6 | Diisopropanolamine | 7.2 g | 250 ml |
| 4509-61-1 | Diethanolamine | 4.8 g | 0 ml |
| 4509-65-6 | Diethanolamine | 4.8 g | 0 ml |
| 4509-68-3 | Diethanolamine | 4.8 g | 0 ml |
| 4371-90 | Control: omit amine | | 60 ml |

The results are that, among the compounds related to diethanolamine, the ethanolamine compound was effective in producing a stable polyol-melamine blend in three of four trials. The fourther unsuccessful trial (4509-59-1) is believed to be anomalous and is reported here for the sake of completeness. Two of three trials with isopropanolamine showed no stabilizing effect on the polyol-melamine mixture. The third successful trial (4509-65-2) with isopropanolamine is believed to be anomalous and is reported here for the sake of completeness. The effective stabilizing compounds which form stable polyol-melamine suspensions are, therefore, diethanolamine, ethanolamine and trihexylamine (see Example 4). The Example 6 tests reveal that the other amine compounds tested; isopropanolamine, 2-amino, 2 methylpropanolamine, amino, trimethoxymethane and diisopropanolamine do not act as stabilizing agents when added to polyol-melamine mixtures. There is no apparent explanation of the stabilizing effect of diethanolamine, ethanolamine and trihexylamine or of the absence of that stabilizing effect with isopropanolamine, 2 amino 2 methyl propanolamine, amino trimethoxymethane and diisopropanolamine.

This Example 7 illustrates the pilot plant commercial embodiment of this invention.

EXAMPLE 7

A mixing tank must be used which is capable of handling a suspension with a high solids content. The power density of the mixing equipment should be at least 3 horsepower/100 gallons. To 100 parts BASF Pluracol Polyol C-133 are added 1 part diethanolamine. After blending is complete 100 parts melamine are added in separate increments amounting to 25% of the total charge in each increment. Each increment must be dispersed before adding the next increment. After the melamine is charged and dispersed blending must continue until a representative sample is smooth and free of clumps. Minimum pilot plant blending times have been 2 to 4 hours.

Tests at high power densities of 15 horsepower/1000 gallons resulted in suspensions having greater sediment and less stability than tests at low power densities of 5 horsepower/1000 gallons. Recommended power densities should be at least 3 horsepower/1000 gallons up to about 10 horsepower/1000 gallons.

We claim:

1. A storage stable suspension of a polyol, melamine and an amine compound for use in the synthesis of flame retardant polyurethane foams which suspension comprises; polyol, melamine and an effective stabilizing amount of an amine compound selected from the group consisting of diethanolamine, ethanolamine, trihexylamine, or mixtures thereof.

2. The storage stable suspension of claim 1 further comprising trichlorofluoromethane.

3. The storage stable suspension of claim 1 wherein to 100 parts polyol and from 20 to 120 parts melamine are added from 1 to 2 parts of an amine compound selected from the group consisting of diethanolamine, ethanolamine, trihexylamine, or mixtures thereof.

4. The storage stable suspension of claim 3 further comprising from 2 to 20 parts trichlorofluoromethane.

5. The storage stable suspension of claim 4 wherein said melamine contains from 7.9 to 64 percent fine melamine particles passing through a 325 mesh sieve.

6. The storage stable suspension of claim 4 wherein said amine compound is diethanolamine.

7. In a method of manufacturing fire retardant polyurethane foams wherein a first reaction stream containing polyol and melamine is combined with a second reaction stream containing polyisocyanate and foaming agent and a third reaction stream containing surfactant, reaction catalyst and water, the improvment which comprises the addition of an effective stabilizing amount of an amine compound selected from the group consisting of diethanolamine, ethanolamine, trihexylamine or mixtures thereof to said first reaction stream creating a stable polyol-melamine suspension stream.

8. The method of claim 7 further comprising the addition of trichlorofluoromethane to said first reaction stream.

9. The method of claim 7 wherein to 100 parts polyol and from 20 to 120 parts melamine are added from 1 to 2 parts of said amine compound.

10. The method of claim 9 further comprising the addition of from 2 to 20 parts trichlorofluoromethane to said first reaction stream.

11. The method of claim 10 wherein from 7.9 to 64 percent of said melamine is fine melamine particles passing through a 325 mesh sieve.

12. the method of claim 11 wherein said amine compound is diethanolamine.

* * * * *